US007802201B2

(12) United States Patent
Lee et al.

(10) Patent No.: US 7,802,201 B2
(45) Date of Patent: Sep. 21, 2010

(54) SYSTEM AND METHOD FOR PANNING AND ZOOMING AN IMAGE ON A DISPLAY OF A HANDHELD ELECTRONIC DEVICE

(75) Inventors: Matthew Richard Lee, Belleville (CA); Fahd Sohail Butt, Mississauga (CA); Tancem Talukdar, Kingston (CA)

(73) Assignee: Research In Motion Limited, Waterloo, Ontario (CA)

( * ) Notice: Subject to any disclaimer, the term of this patent is extended or adjusted under 35 U.S.C. 154(b) by 761 days.

(21) Appl. No.: 11/618,382

(22) Filed: Dec. 29, 2006

(65) Prior Publication Data

US 2008/0163116 A1 Jul. 3, 2008

(51) Int. Cl.
*G06F 3/048* (2006.01)
(52) U.S. Cl. .................. 715/825; 715/864; 715/800; 715/801; 345/167
(58) Field of Classification Search ............... 345/156, 345/660–661, 167; 715/825, 864, 800, 801
See application file for complete search history.

(56) References Cited

U.S. PATENT DOCUMENTS

| 6,121,968 | A | * | 9/2000 | Arcuri et al. ................. 715/825 |
| 6,741,232 | B1 | * | 5/2004 | Siedlikowski et al. ........ 345/156 |
| 2002/0154150 | A1 | * | 10/2002 | Ogaki et al. ................. 345/684 |
| 2003/0184517 | A1 | * | 10/2003 | Senzui et al. ............... 345/156 |
| 2004/0001105 | A1 | * | 1/2004 | Chew et al. ................. 345/817 |

* cited by examiner

*Primary Examiner*—Kieu Vu
*Assistant Examiner*—Darrin Hope
(74) *Attorney, Agent, or Firm*—Novak Druce & Quigg LLP

(57) ABSTRACT

Method and arrangement for panning and zooming a displayed image on a display screen of a handheld electronic device 300 using the same auxiliary user input device 328 is described. The displayed image can be toggled between panning and zooming modes that respectively pan and zoom the displayed image by successively actuating the auxiliary user input device 328.

11 Claims, 16 Drawing Sheets

SYSTEM AND METHOD FOR PANNING AND ZOOMING AN IMAGE ON A DISPLAY OF A HANDHELD ELECTRONIC DEVICE

A portion of the disclosure of this patent document contains material which is subject to copyright protection. The copyright owner has no objection to the facsimile reproduction by any one of the patent document or patent disclosure as it appears in the Patent and Trademark Office patent file or records, but otherwise reserves all copyright rights whatsoever.

FIELD

The present disclosure, in a broad sense, is directed toward handheld electronic devices including those without communication capabilities such as Personal Digital Assistants (PDAs). More specifically, the disclosure is directed toward handheld communication devices that have wireless communication capabilities and the networks within which the wireless communication devices operate. Furthermore, the present disclosure also relates to the user interfaces of the device, as well as the software that controls and runs applications on the device. More particularly, to zooming and panning of a displayed image utilizing the same user input device by toggling between panning and zooming modes.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites and file attachments to e-mail such as image files. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

BRIEF DESCRIPTION OF THE DRAWINGS

Exemplary methods and arrangements conducted and configured according to the advantageous solutions presented herein are depicted in the accompanying drawings wherein:

FIG. 12 illustrates an exemplary Dvorak keyboard layout;

FIG. 13 illustrates a QWERTY keyboard layout paired with a traditional ten-key keyboard;

FIG. 14 illustrates ten digits comprising the numerals 0-9 arranged as on a telephone keypad, including the * and # astride the zero;

FIG. 15 illustrates a numeric phone key arrangement according to the ITU Standard E.161 including both numerals and letters;

DETAILED DESCRIPTION

Figure 1:
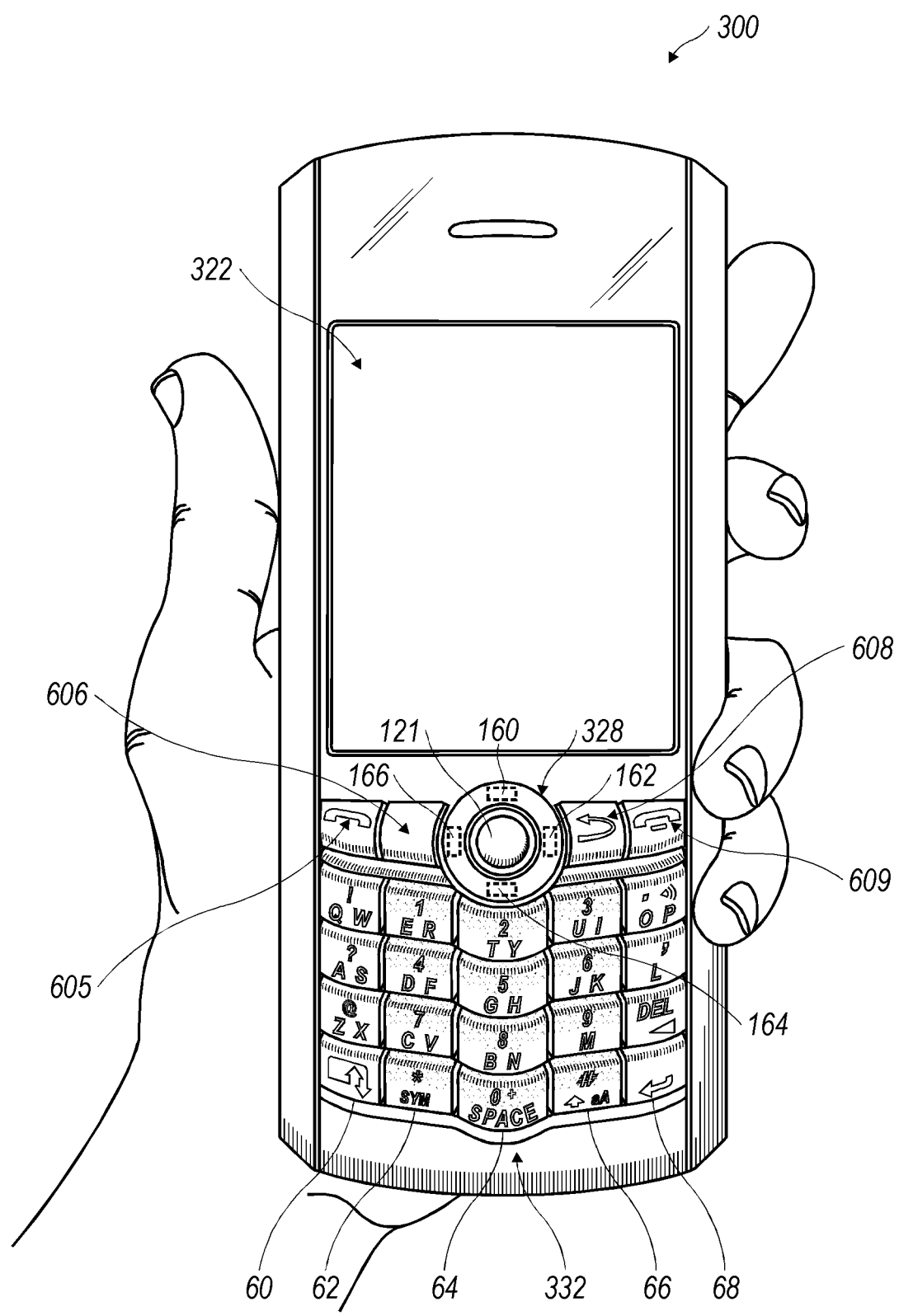
FIG. 1 illustrates a front view of a trackball incorporating handheld electronic device cradled in a user's hand.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held, however additional control can be effected by using both hands. As a handheld device that is desirably pocketable, the size of the device must be kept relatively small. Of the device's dimensions, limiting its width is important for the purpose of assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent when considering hand-cradleablability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" on the front face of the device, where it is most advantageous to include a display screen that outputs information to the user. The display screen is preferably located above a keyboard that is utilized for data entry into the device by the user. If the screen is provided below the keyboard, a problem occurs in that viewing the screen is inhibited when the user is inputting data using the keyboard. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter (see FIGS. 16 and 17 for an example). This is preferred by some users because it can be arranged to resemble a standard keyboard with which they are most familiar. In this regard, the associated letters can be advantageously organized in QWERTY, QWERTZ, AZERTY or Dvorak layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith (see FIGS. 18-21 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids. Preferably, this character discrimination is accomplished utilizing disambiguation software included on the device. To accommodate software use on the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device. It should be further appreciated that the keyboard can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device preferably includes an auxiliary input device that acts as a cursor navigational tool and which is also exteriorly located upon the front face of the device. Its front face location is particularly advantageous because it makes the tool easily thumb-actuable like the keys of the keyboard. In a particularly useful embodiment, the navigational tool is a trackball which is easily utilized to instruct two-dimensional screen cursor movement in substantially any direction, as well as act as an actuator when the ball of the trackball is depressed like a button. The placement of the trackball is preferably above the keyboard and below the display screen; here, it avoids interference during keyboarding and does not block the user's view of the display screen during use (see FIG. 1 for an example).

In some configurations, the handheld electronic device may be standalone in that it does not connect to the "outside world." One example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device is significantly enhanced when connectable within a system, and particularly when connectable on a wireless basis in a network in which voice, text messaging, and other data transfer are accommodated.

Figure 3:
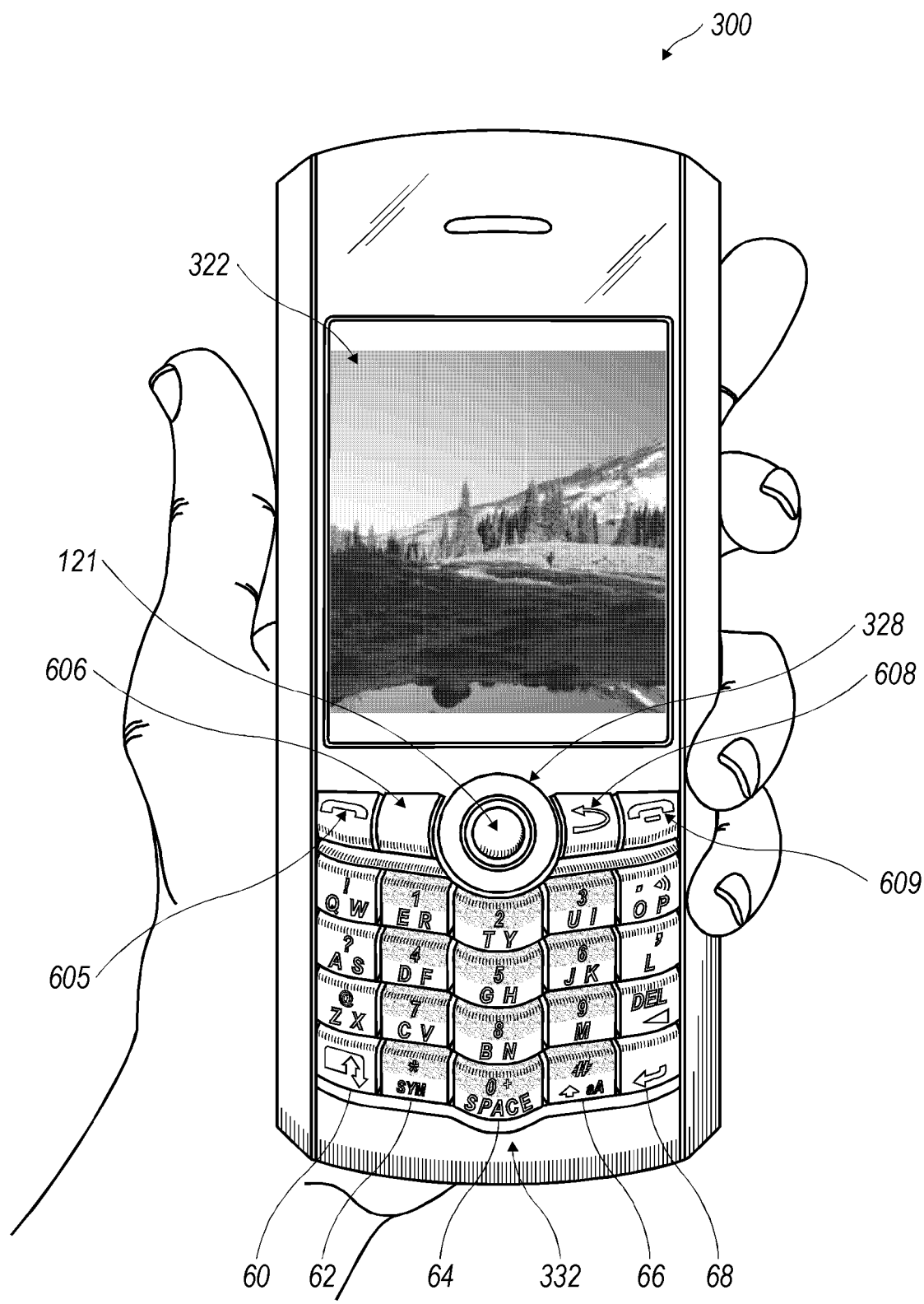
FIG. 3 illustrates a perspective view of a trackball incorporating handheld electronic device with a picture displayed on the display screen.

The present solutions are directed to methods and arrangements for panning and zooming a displayed image on a display screen 322 of a relatively small, wireless handheld communication device 300, variously configured as described above, such as that depicted in FIG. 1. One exemplary embodiment takes the form of a method for panning and zooming a displayed image on a display screen 322 of a handheld electronic device 300. The method includes displaying an image, such as a picture shown in FIG. 3, on the display screen 322 that is both pannable and zoomable using the same auxiliary user input device 328. Successively actuating the auxiliary user input device 328 on the device 300 toggles an operation mode between panning and zooming modes.

In one embodiment, menu options of user-selectable actions associated with the displayed image (see FIG. 4a) are displayed on the display screen 322 upon a user's request through actuation of an auxiliary user input device 328. The menu options 200 displayed may be an abbreviated menu having a short list of menu options which is a subset of a full menu of options of user-selectable actions available relative to the displayed image. The user-selectable actions of the short list of menu options 200 have been assessed a higher probability for being user-selected than at least some of the user-selectable actions of the full menu of options that are not included in said short list of menu options 200.

Figure 4A:
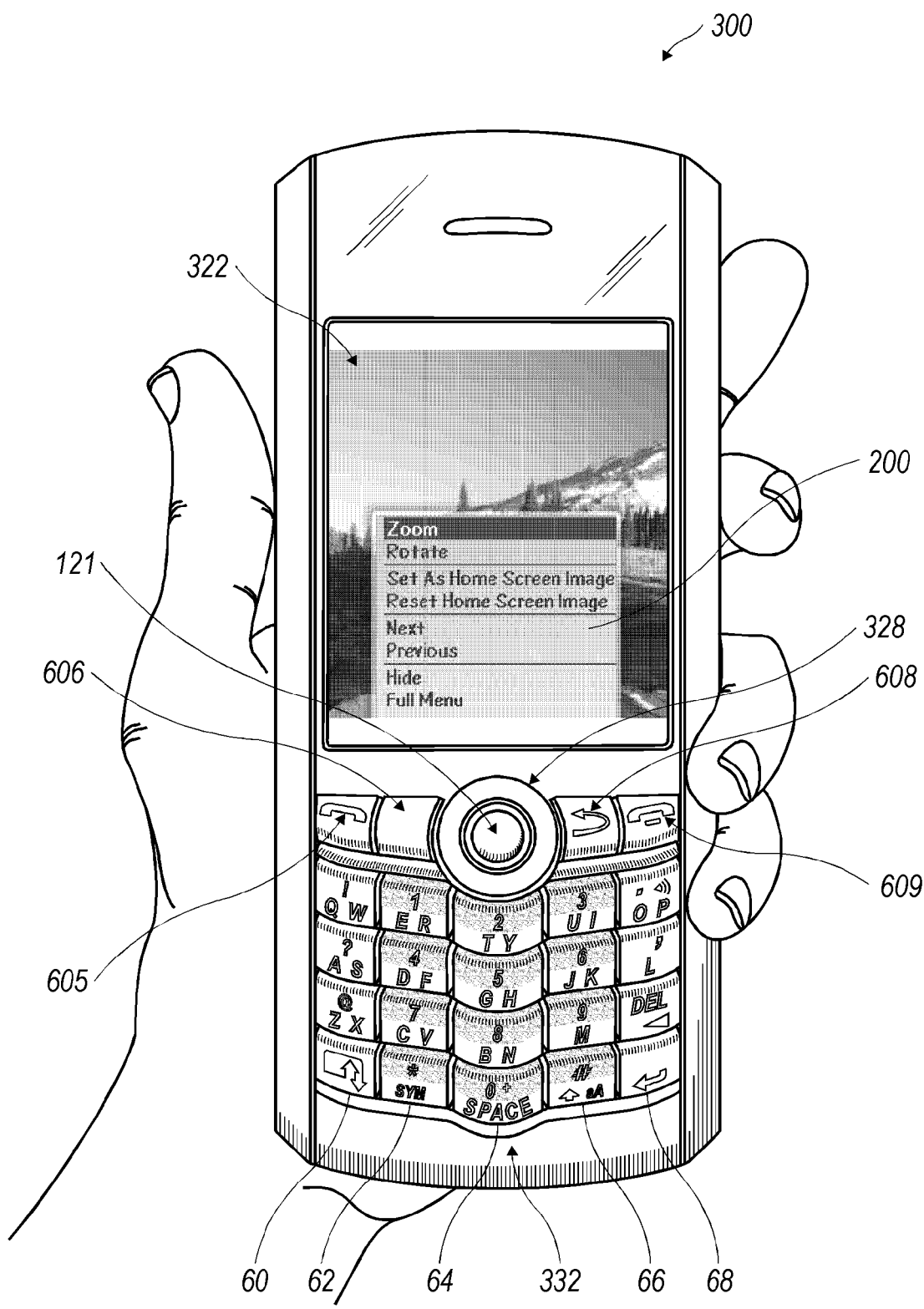
FIG. 4a illustrates a view showing a short list of menu options displayed over an image with an option for zooming being a default option, where the image is a picture.

In the example of FIG. 4a where the operation mode immediately before the user's actuating the auxiliary user input device 328 was a panning mode, the short list of menu options 200 includes an option for zooming. In at least one embodiment, when the operation mode immediately before the user's actuating the auxiliary user input device 328 was a zooming mode, the short list of menu options includes an option for panning. In another embodiment, the short list of menu options of user-selectable actions may not be displayed through actuation of the auxiliary user input device 328, but instead the operation modes are directly toggled between panning and zooming modes by actuating the auxiliary user input device 328 without displaying such a short list of menu options. In still another embodiment, toggling between panning and zooming modes may be actuated through displaying the short list of menu options upon actuation of the auxiliary user input device 328 in one way, but toggling the mode back to the original mode may be actuated without displaying such a short list of menu options. For example, the short list of menu options 200 that includes an option for zooming may be displayed by actuating the auxiliary user input device 328 when the operation mode immediately before the actuation of the auxiliary user input device 328 was panning, while the operation mode may be toggled back to panning directly by again actuating the auxiliary user input device 328.

Figure 4B:
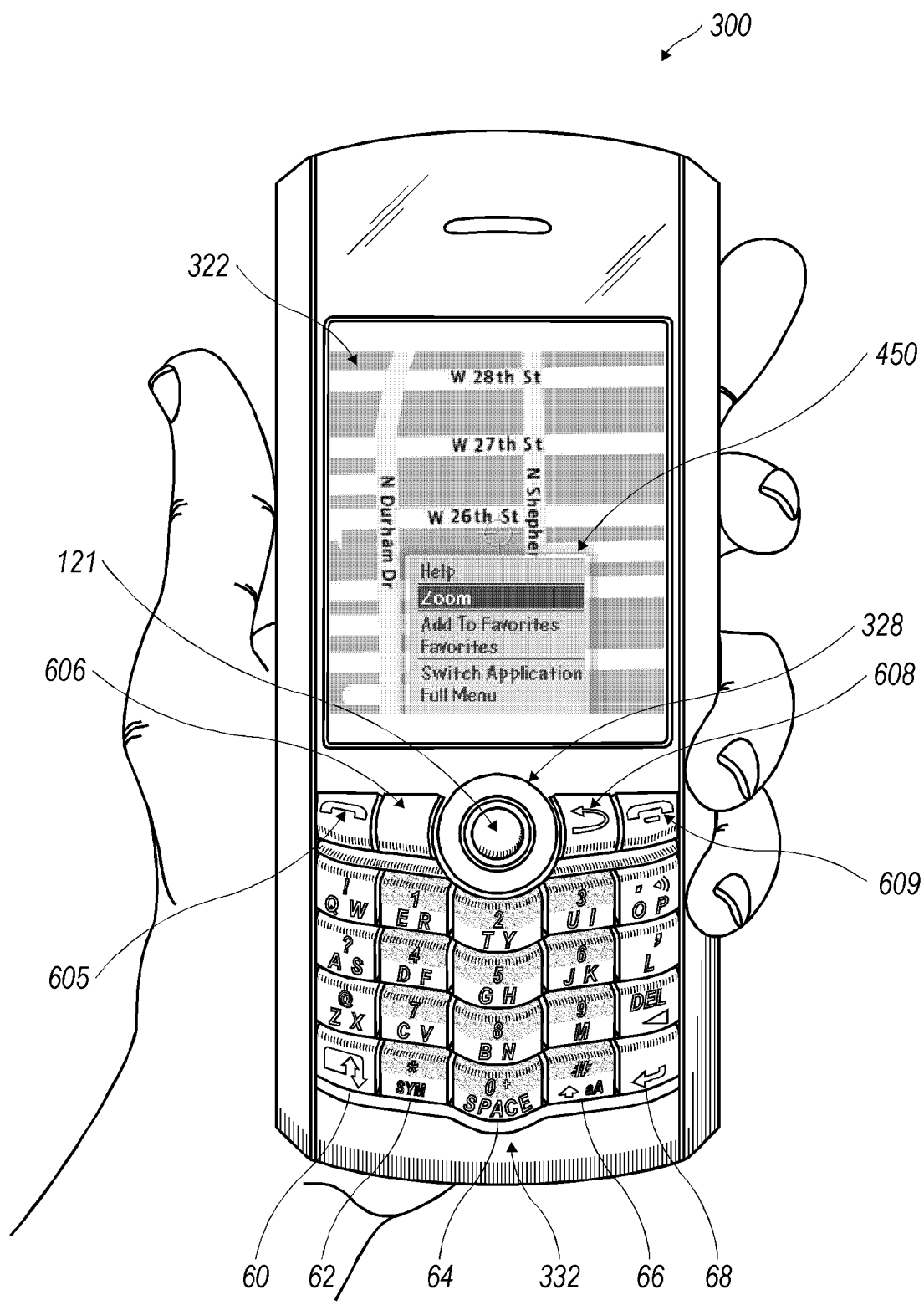
FIG. 4b illustrates a view showing a short list of menu options displayed over an image with an option for zooming being a default option, where the image is a map.

In one embodiment, the short list of menu options has a default designated option for one of panning the displayed image and zooming the displayed image depending on past activity taken by the user relative to the displayed image. For example, the short list of menu options 200 has a default designated option for zooming the displayed image when the image has been more recently panned than zoomed, as shown in FIG. 4a. When the displayed image includes an entire portion of the image, panning the image may not be necessary or available to see different portions of the image. In such a case, the short list of menu options 200 that is displayed upon actuation of the auxiliary user input device 328 may still have a default designated option for zooming the displayed image if the image has not been zoomed before the actuation of the auxiliary user input device 328. FIG. 4b illustrates another example of the short list of menu options having a default-designated option for zooming the displayed image. In the example of FIG. 4b the subject image is a map rather than a picture. The short list of menu options may have a default selected option for panning the displayed image when the image has been more recently zoomed than panned. The full menu of options available relative to the displayed image may alternatively be displayed instead of the short list of menu options.

Figure 2:
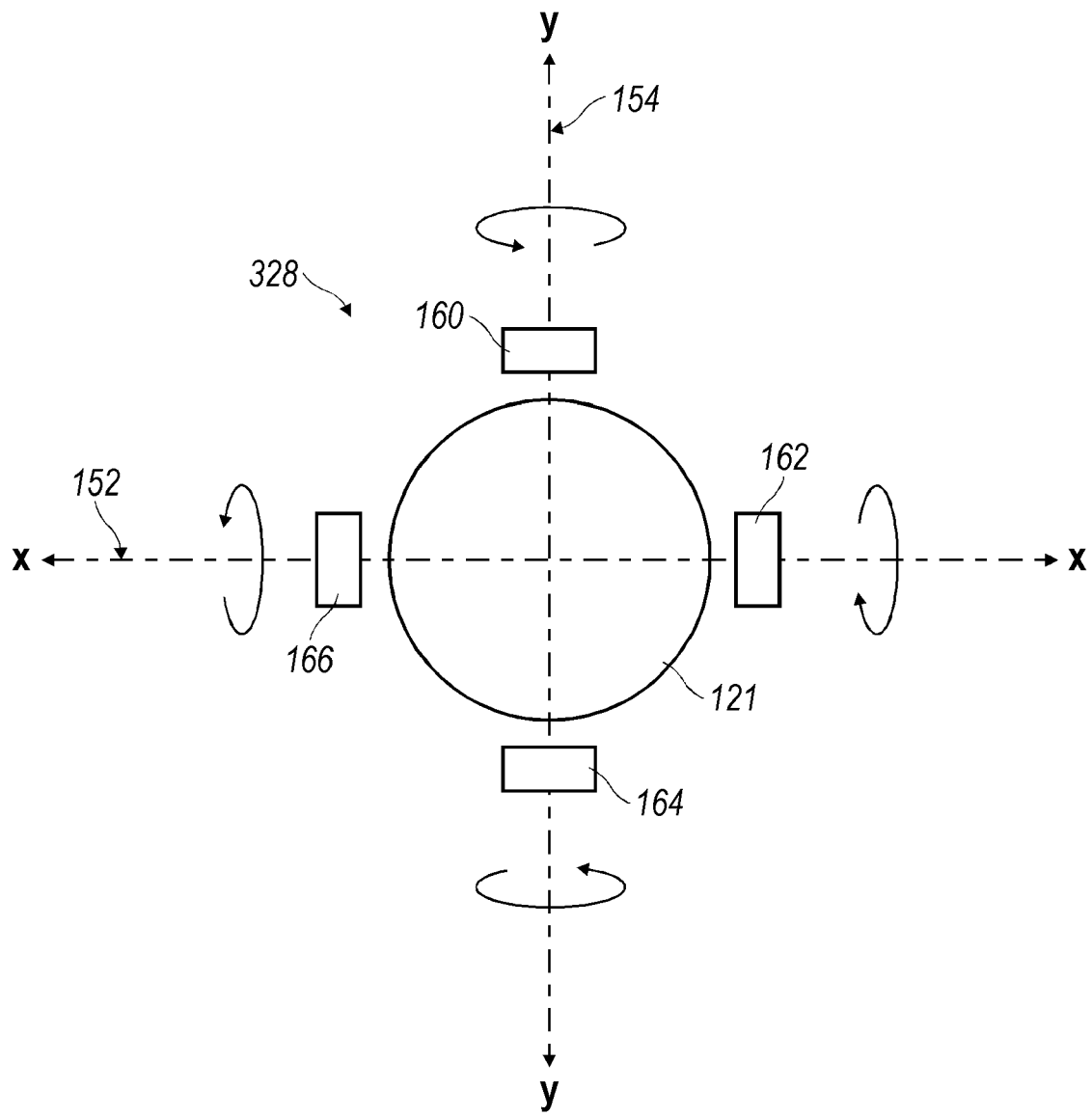
FIG. 2 illustrates a schematic representation of an auxiliary input device in the form of a trackball assembly.

As depicted in FIG. 1, the auxiliary user input device is a trackball 121. Motion of the trackball 121 is assessed using a plurality of sensors 160, 162, 164, and 166 that quantify rotational motion of the trackball 121 about an intersecting x-axis 152 and an intersecting y-axis 154 of the trackball (see FIG. 2). The trackball 121 is at least rotatable up-and-down and right-and-left relative to the handheld electronic device 300 and the trackball 121 is press-actuable for toggling between the panning and zooming modes.

In one embodiment, up-and-down rotation of the trackball 121 results in in-and-out zooming of the displayed image, when the device 300 is in the zooming mode. On the other hand, up-and-down and right-and-left rotation of the trackball 121 results in corresponding image panning relative to the displayed image.

Figure 22:
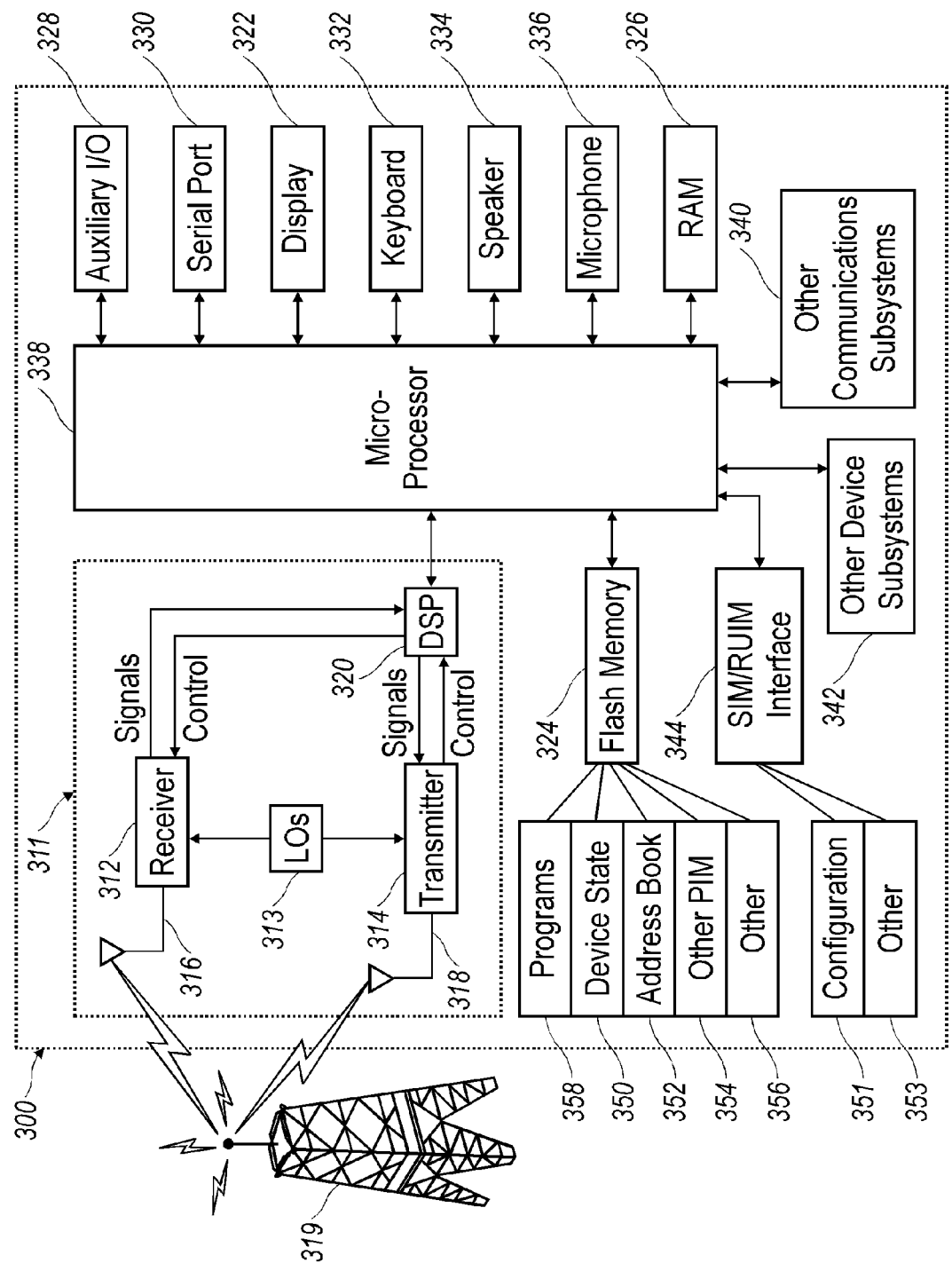
FIG. 22 is a block diagram representing a wireless handheld communication device interacting in a communication network.

As depicted in FIG. 22, the handheld communication device 300 transmits data to, and receives data from a communication network 319 utilizing radio frequency signals, the details of which are discussed more fully hereinbelow. Preferably, the data transmitted between the handheld communication device 300 and the communication network 319 supports voice and textual messaging, though it is contemplated that the method for affecting diagonal cursor movement is equally applicable to single mode devices; i.e. voice-only devices and text-only devices.

Figure 5:
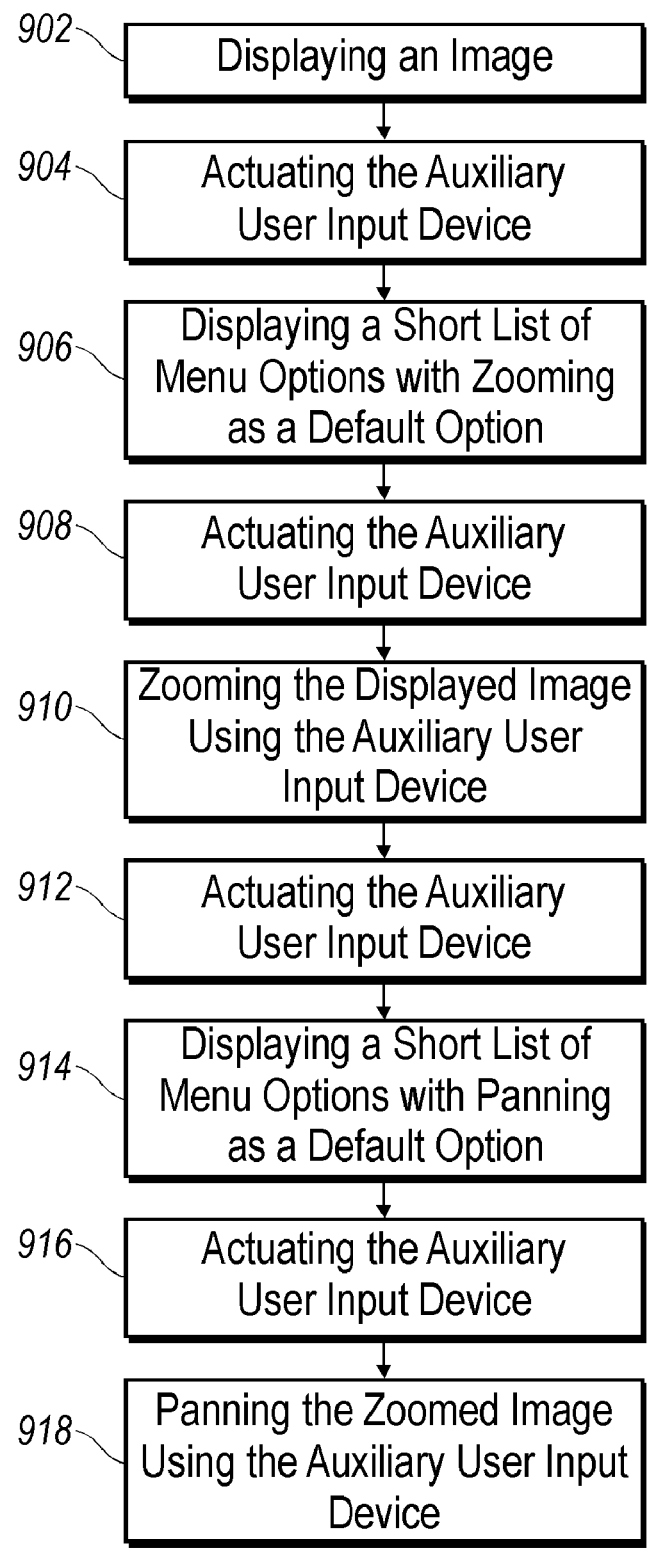
FIG. 5 illustrates a flow chart showing an exemplary method of panning and zooming an image.

FIG. 5 is a flow chart illustrating one embodiment of the method for panning and zooming a displayed image on the display screen 322 of the handheld electronic device 300. An image is displayed on the display screen 322 such as by the user's opening an image file (902). Upon the user's actuation of the auxiliary user input device 328, for example by pressing the trackball 121 (904), a short list of menu options 200 with zooming as a default option is displayed on the display screen (906). Since the zooming option is already set as a default option, the operation mode is toggled to the zooming mode by again actuating the auxiliary user input device 328 (908). The user now zooms in and out the displayed image using up-down motion of the trackball 121 (910). Once the displayed image is zoomed in and only a portion of the image is shown on the display screen 322, the user may want to pan around the image to see different portions of the image. This is achieved by the user's actuating the auxiliary user input device 328 (912), which in turn displays a short list of menu options with panning as a default option (914). By again actuating the auxiliary user input device 328 (S408), the user can now pan the zoomed image using up-down and left-right motion of the trackball 121 (S409). Alternatively, displaying the short list of menu options with panning as a default option (S407) and actuating the auxiliary user input device (S408) to select the default panning option may be omitted. In such a case, actuating the auxiliary user input device (S406) after zooming toggles back to the panning mode in which the user can pan the zoomed image using up-down and left-right motion of the trackball 121 of the auxiliary user input device 328 (S409).

Figure 6:
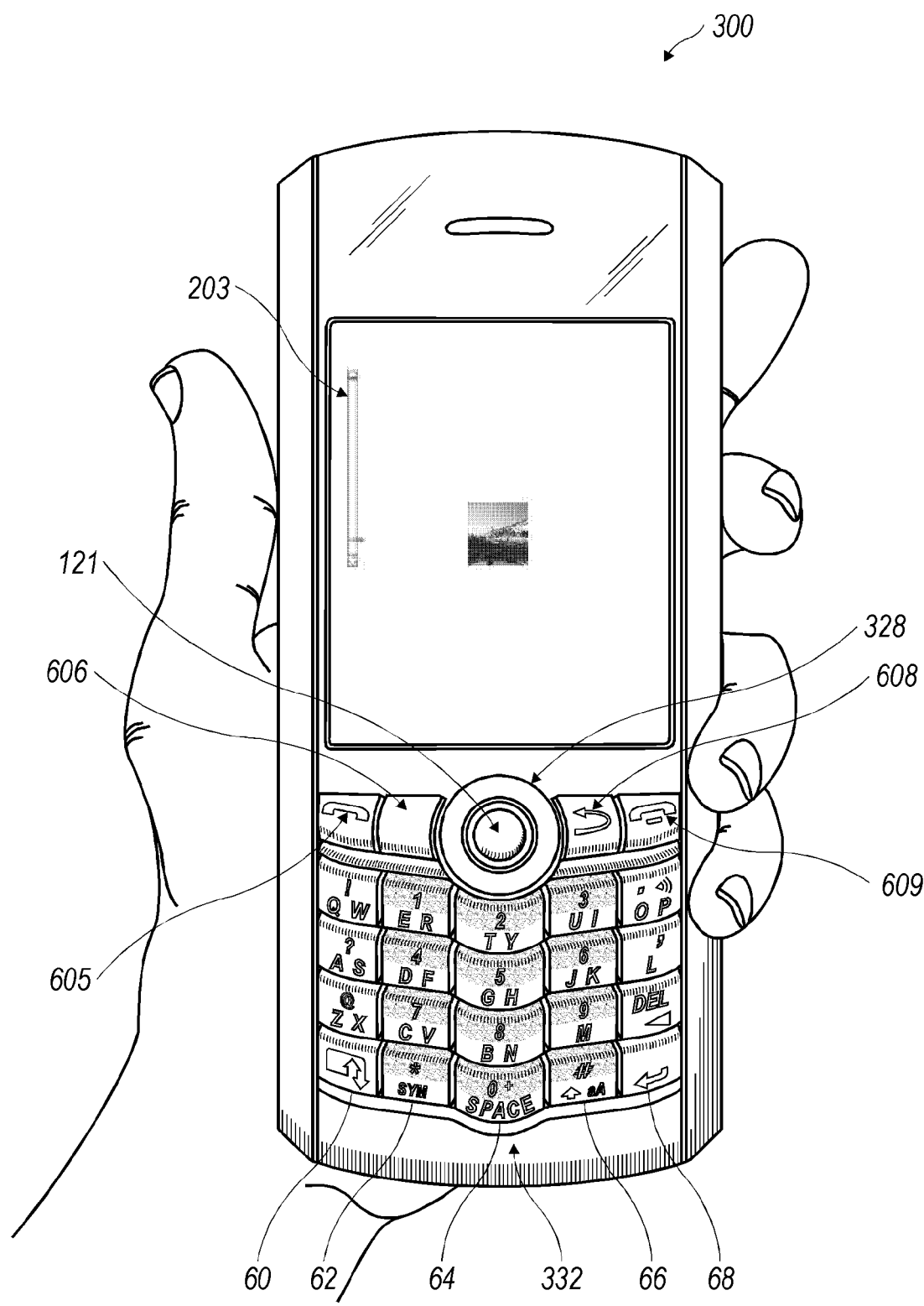
FIG. 6 illustrates an exemplary image displayed on the display screen when the device is in a zooming mode.
Figure 7:
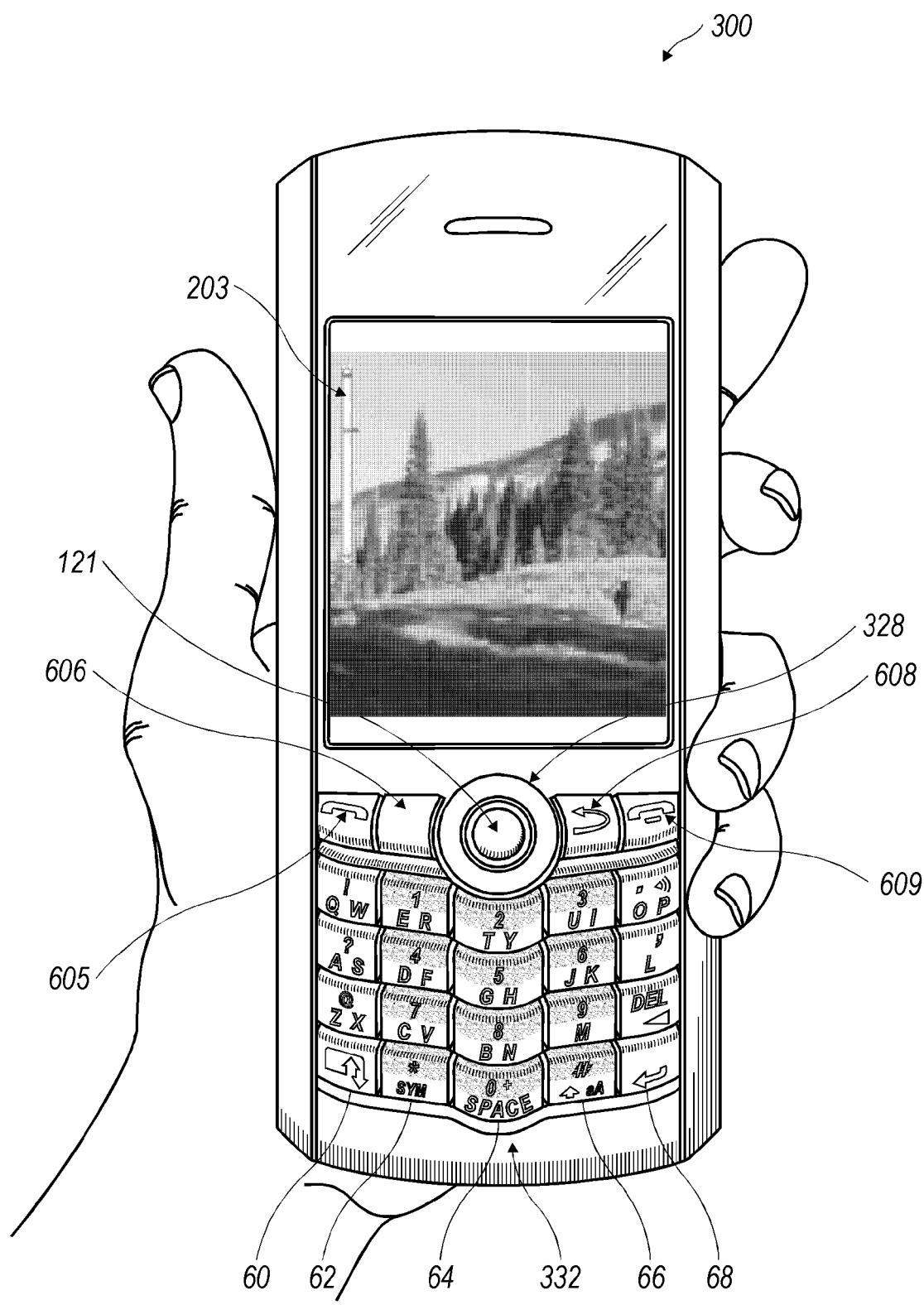
FIG. 7 illustrates another exemplary image in a zooming mode in which the image is further zoomed as compared with FIG. 6.
Figure 8:
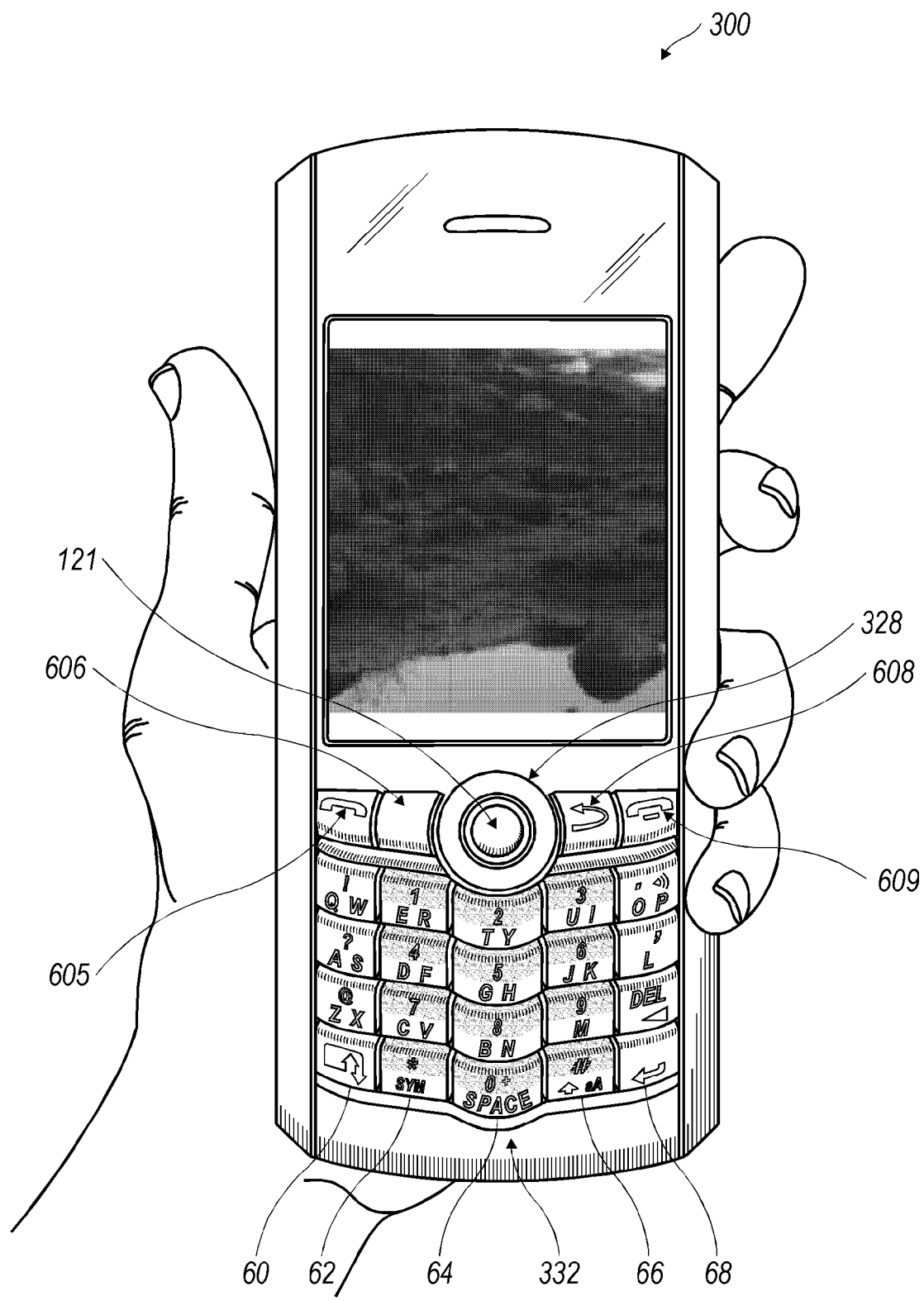
FIG. 8 illustrates an exemplary image in which the displayed image is shifted from the image shown in FIG. 7.

FIGS. 6 and 7 respectively show images on the display screen 322 having different degrees of zooming in the zooming mode. When the operation mode is zooming, a bar 203 indicating a degree of zooming appears on the display screen. FIG. 7 shows the image that is further zoomed-in from the image shown in FIG. 6. When the image is zoomed-in as shown in FIG. 7, the user cannot see the entire image and therefore may want to pan the image to see different portions of the image. This can be achieved by toggling the device to the panning mode by actuating the auxiliary user input device 328. FIG. 8 shows an image that has been shifted from the image shown in FIG. 7 as a result of the user's panning the image.

In yet another embodiment, a handheld electronic device 300 is disclosed that is capable of panning and zooming a displayed image on a display screen 322 of a handheld electronic device 300 using the same auxiliary user input device 328. The display screen 322 is provided to display an image that is both pannable and zoomable, and the auxiliary user device 328 capable of both panning and zooming the image is also provided on the device 300. A keyboard 332 is located below the display screen 322 and configured to accommodate textual input to the handheld electronic device 300. A microprocessor is included that has a control program associated therewith for controlling operation of the handheld electronic device 300. The control program is configured to toggle between panning and zooming modes that respectively pan and zoom the displayed image by successively actuating the auxiliary user input device 328.

The handheld electronic device 300 comprises a radio transmitter 318 capable of transmitting data to a communication network 319 utilizing radio frequency signals and a radio receiver 312 capable of receiving data from the communication network 319 utilizing radio frequency signals. The handheld electronic device 300 is sized to be cradled in the palm of a user's hand.

Still another embodiment takes the form of a processing subsystem configured to be installed in a handheld electronic device 300 comprising a user interface including a display 322 and a keyboard 332 having a plurality of input keys with which letters are associated. The processing subsystem serves as an operating system for the incorporating device 300. The processing subsystem preferably includes a microprocessor 338 and a media storage device connected with other systems and subsystems 342 of the device 300. The microprocessor 338 can be any integrated circuit or the like that is capable of performing computational or control tasks. The media storage device can exemplarily include a flash memory 324, a hard drive, a floppy disk, RAM 326, and other similar storage media.

As stated above, the operation system software controls operation of the incorporating handheld electronic device 300. The operation software is programmed to control operation of the handheld electronic device 300 and the control program is configured to display an image on the display screen 322 and to toggle between panning and zooming modes that respectively pan and zoom the displayed image by successively actuating the auxiliary user input device 328. The control program is further configured to display menu options of user-selectable actions 200 associated with the displayed image by actuating the auxiliary user input device 328. Based on the actuation of the auxiliary user input device, the operating system software displays an abbreviated menu having a short list of menu options which is a subset of a full menu of options of user-selectable actions available relative to the at least one designated email message and the user-selectable actions of said short list of menu options having been assessed a higher probability for being user-selected than at least some of the user-selectable actions of the full menu of options that are not included in said short list of menu options. The processing subsystem also includes the various features described above in relation to the handheld device 300 embodiments.

Further aspects of the environments, devices and methods of employment described hereinabove are expanded upon in the following details. An exemplary embodiment of the handheld electronic device as shown in FIG. 1 is cradleable in the palm of a user's hand. The size of the device is such that a user is capable of operating the device using the same hand that is holding the device. In a preferred embodiment, the user is capable of actuating all features of the device using the thumb of the cradling hand. The preferred embodiment of the handheld device features a keyboard on the face of the device, which is actuable by the thumb of the hand cradling the device. The user may also hold the device in such a manner to enable two thumb typing on the device. Furthermore, the user may use fingers rather than thumbs to actuate the keys on the device. In order to accommodate palm-cradling of the device by the average person, it is longer (height as shown in FIG. 1) than it is wide, and the width is preferably between approximately two and three inches, but by no means limited to such dimensions.

The handheld electronic device includes an input portion and an output display portion. The output display portion can be a display screen, such as an LCD or other similar display device.

The input portion includes a plurality of keys that can be of a physical nature such as actuable buttons or they can be of a software nature, typically constituted by virtual representations of physical key on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device is shown on the display screen in the same configuration as the physical keys. Thus, the desired character, command or function is obtained by depressing the physical key corresponding to the character, command or function displayed at a corresponding position on the display screen, rather than touching the display screen. To aid the user, indicia for the characters, commands and/or functions most frequently used are preferably positioned on the physical keys and/or on the area around or between the physical keys. In this manner, the user can more readily associate the correct physical key with the character, command or function displayed on the display screen.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 9:
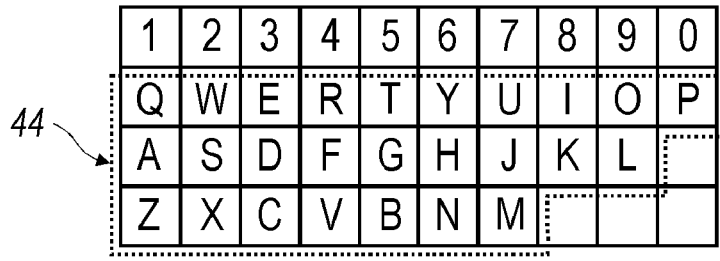
FIG. 9 illustrates an exemplary QWERTY keyboard layout.

The QWERTY keyboard layout is the standard English-language alphabetic key arrangement 44 (see FIG. 9). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878.

Figure 10:
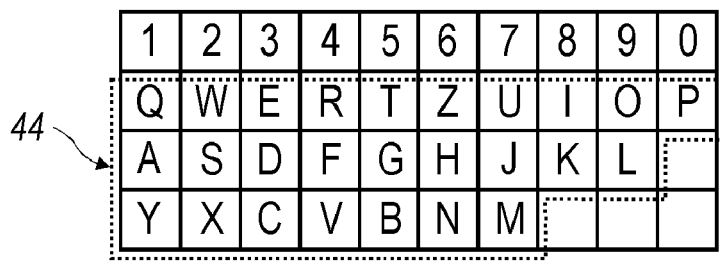
FIG. 10 illustrates an exemplary QWERTZ keyboard layout.

The QWERTZ keyboard layout is normally used in German-speaking regions. This alphabetic key arrangement 44 is shown in FIG. 10. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 11:
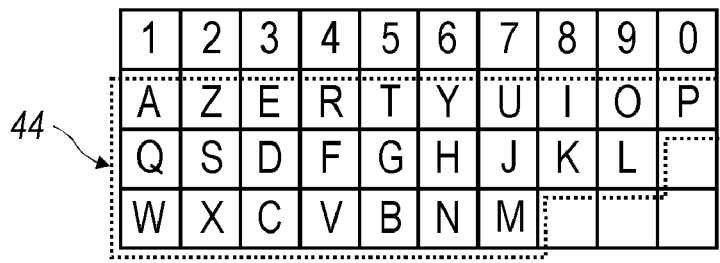
FIG. 11 illustrates an exemplary AZERTY keyboard layout.

The AZERTY keyboard layout is normally used in French-speaking regions. This alphabetic key arrangement 44 is shown in FIG. 11. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 12, 13, 14, 15:
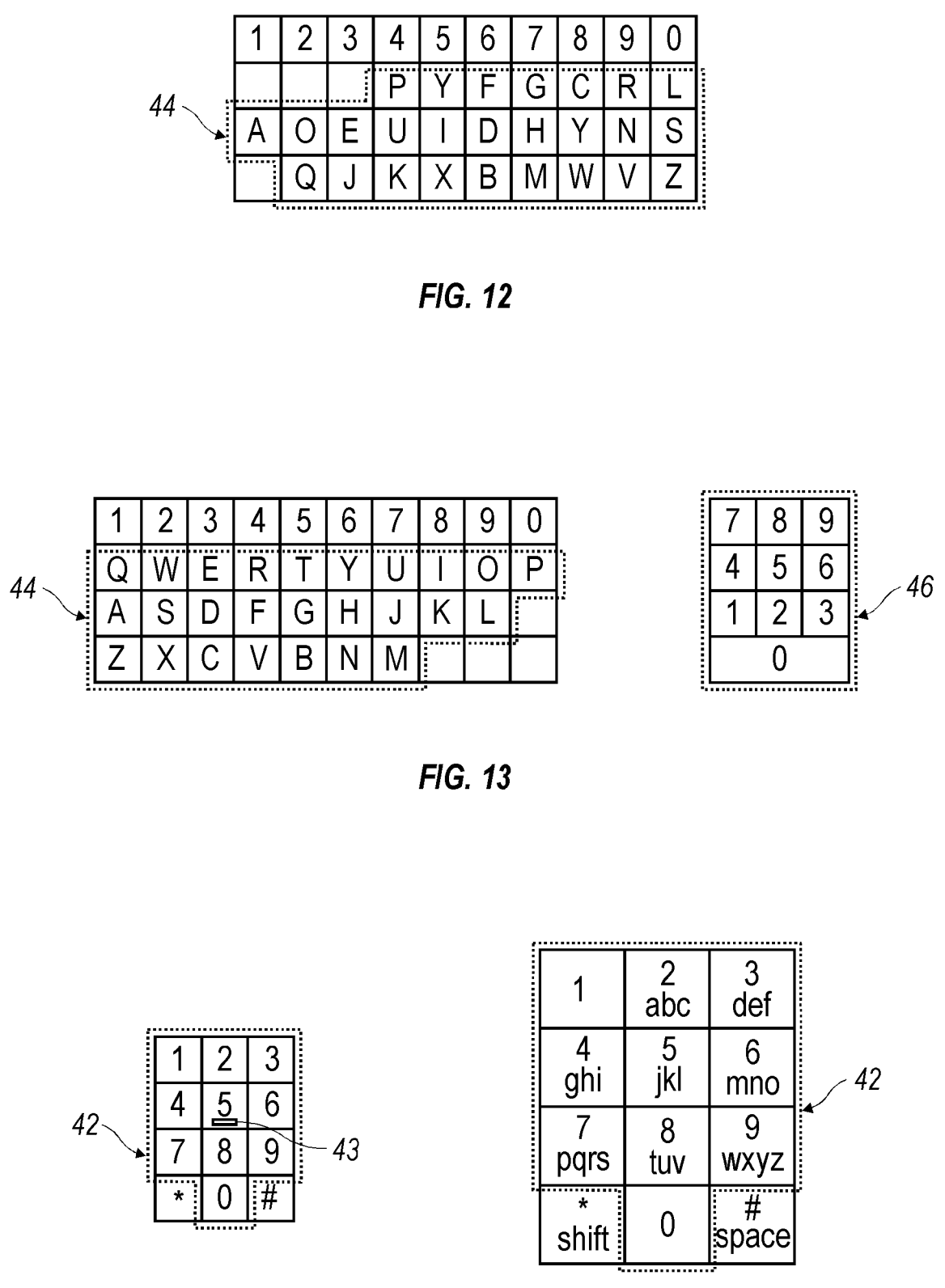

The Dvorak keyboard layout was designed in the 1930s by August Dvorak and William Dealey. This alphabetic key arrangement 44 is shown in FIG. 12. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements are often presented along with numeric key arrangements. Typically, the numbers 1-9 and 0 are positioned in the row above the alphabetic keys 44, as shown in FIG. 9-12. Alternatively, the numbers share keys with the alphabetic characters, such as the top row of the QWERTY keyboard (see FIG. 16 for an example). Yet another exemplary numeric key arrangement is shown in FIG. 13, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 14.

As shown in FIG. 14, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

Figure 16:
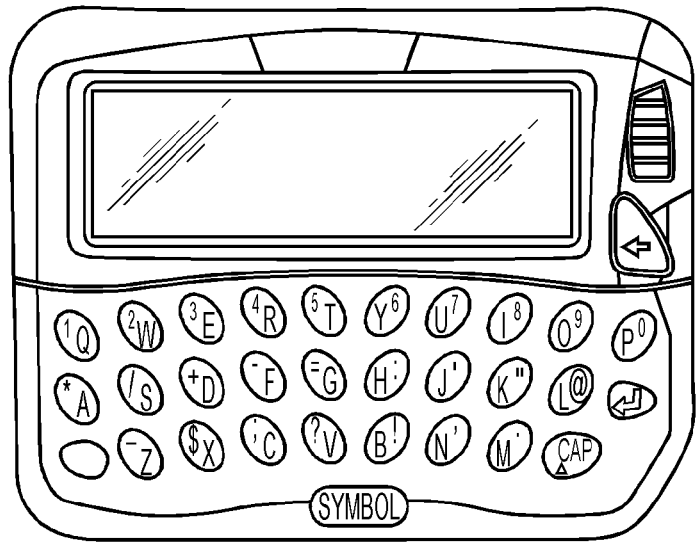
FIG. 16 is a front view of an exemplary handheld electronic device including a full QWERTY keyboard.
Figure 17:
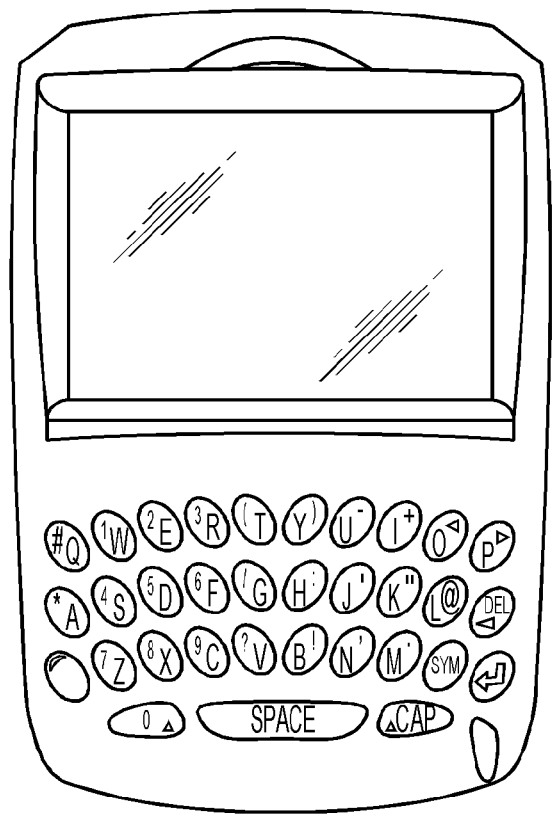
FIG. 17 is a front view of another exemplary handheld electronic device including a full QWERTY keyboard.

Devices 300 incorporating full keyboards for the alphabetic characters are shown in FIGS. 16 and 17. While both devices feature numeric keys, the device shown in FIG. 16 incorporates the numeric keys in a single row, whereas the device of FIG. 17 features numeric keys arranged according to the ITU Standard E.161 as shown in FIG. 14. The latter numeric arrangement can be described as an overlaid numeric phone keypad arrangement.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types of handheld electronic device 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ming." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys.

Figure 19:
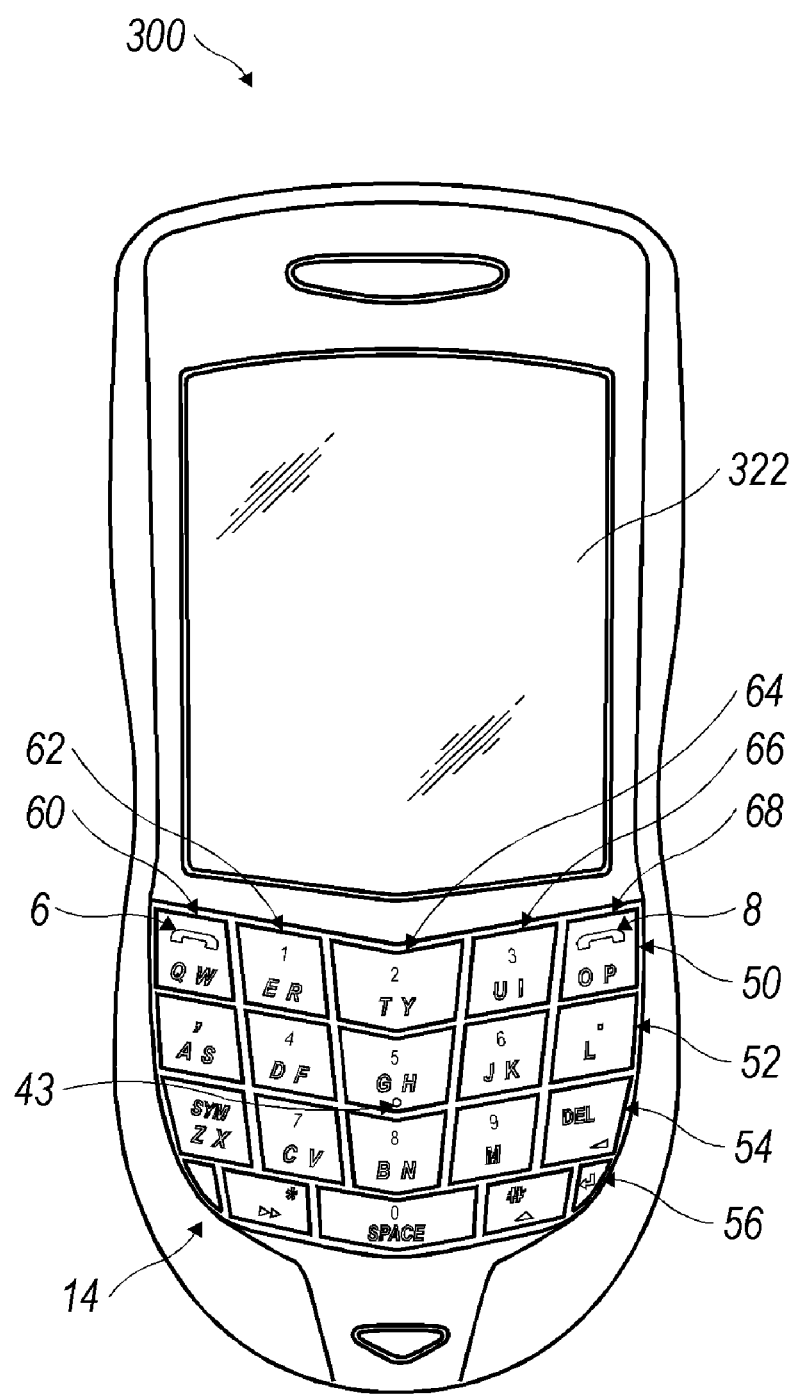
FIG. 19 is an front view of the front face of another exemplary handheld electronic device including a reduced QWERTY keyboard.
Figure 20:
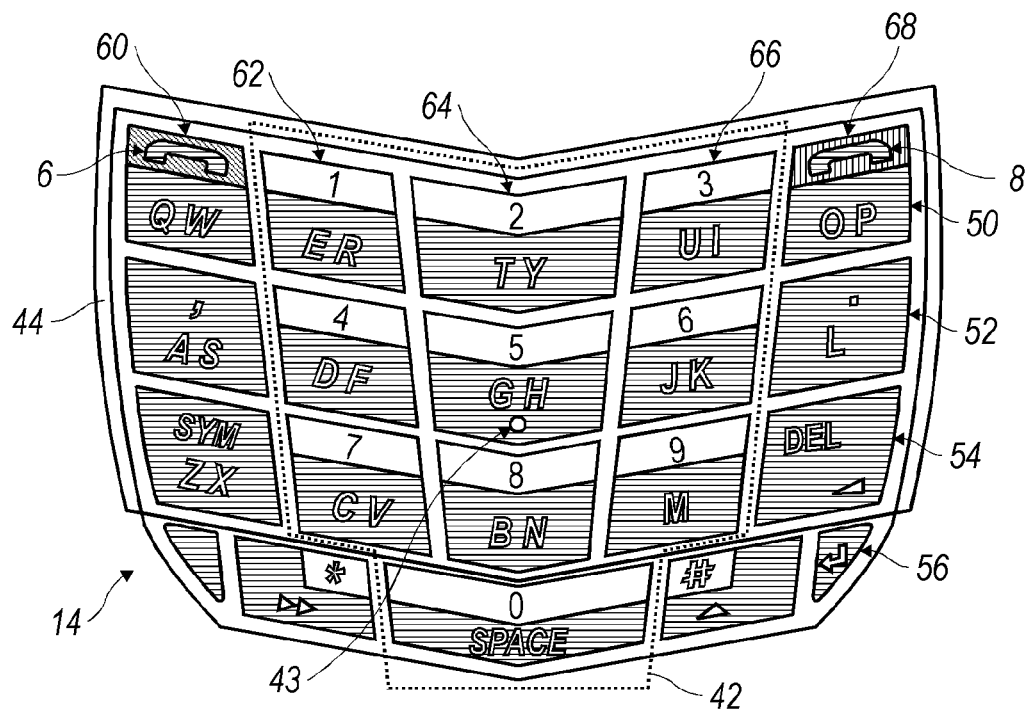
FIG. 20 is a detail view of the reduced QWERTY keyboard of device of FIG. 19.

FIGS. 19 and 20 show examples of physical keyboard array of 20 keys composed of five columns and four rows. Fourteen keys on the keyboard 332 are associated with alphabetic characters and ten keys are associated with numbers. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 of the example of FIG. 20 include a color scheme that is different from that of the remaining keys associated with the QWERTY key arrangement.

In this example, a color scheme of the numeric phone keys has a two tone appearance, with the upper portion of the numeric keys being a first color and the lower portion of the numeric keys being a second color. The first color may be lighter than the second color, or darker than the second color. Furthermore, the send key and end key are located on keys with alphabetic indicia have a background color and/or color of the symbols that are different from the other keys of the keyboard 332.

Figure 18:
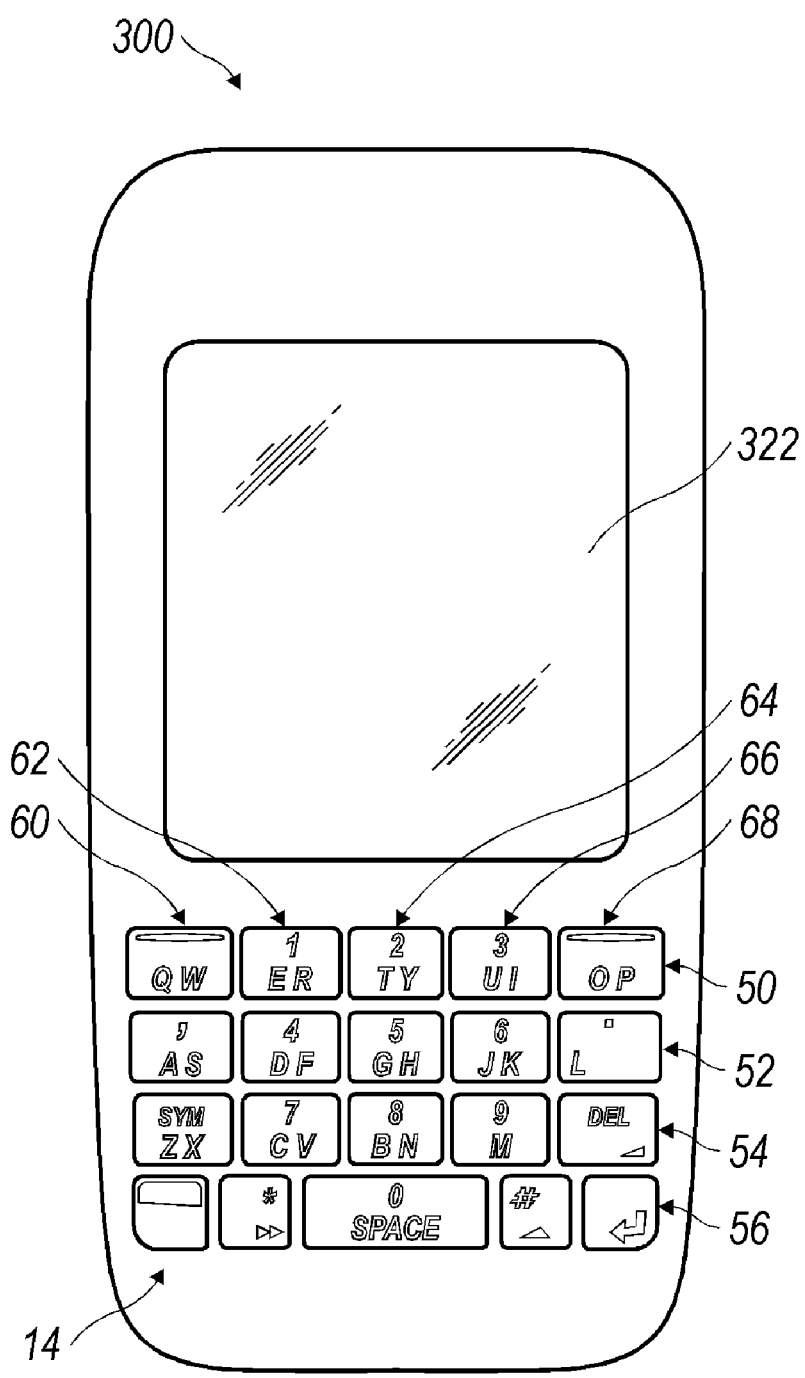
FIG. 18 is a front view of an exemplary handheld electronic device including a reduced QWERTY keyboard.
Figure 21:
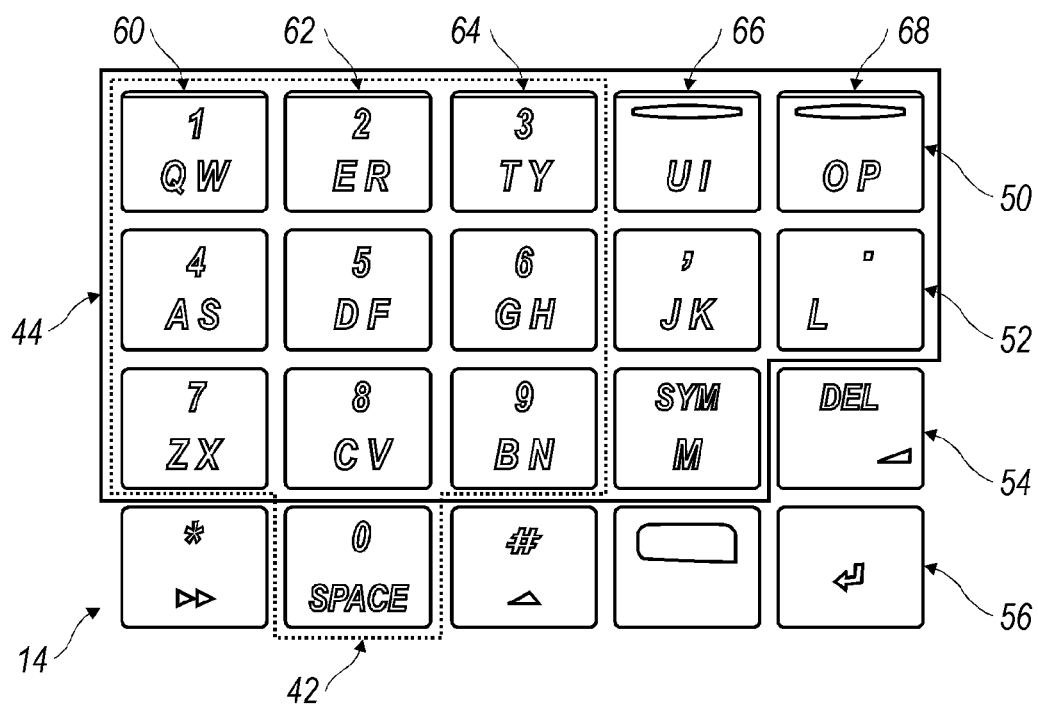
FIG. 21 is a detail view of an alternative reduced QWERTY keyboard.

FIG. 21 shows a similar format for the reduced QWERTY arrangement of alphabetic characters 44 as presented in FIG. 18, but the numeric phone key arrangement 42 is positioned in the first 60, second 62, and third 64 columns instead of being centered on the keyboard 332. Thus, no numerals are presented on keys in the fourth 66 and fifth 68 columns. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK/,", and "L/." The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 15. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 14 (no alphabetic letters) and 15 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI T1.703-1995/1999 and ISO/IEC 9995-8:1994. Regarding the numeric arrangement, it can be aptly described as a top-to-bottom ascending order three-by-three-over-zero pattern.

An exemplary handheld electronic device 300 and its cooperation in a wireless network 319 is exemplified in the block diagram of FIG. 22. This figure is exemplary only, and those persons skilled in the art will appreciate the additional elements and modifications necessary to make the device 300 work in particular network environments.

The block diagram of FIG. 22 representing the communication device 300 interacting in the communication network 319 shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool. The navigation tool is preferably a trackball based device, but it can be a thumbwheel, navigation pad, or joystick. These navigation tools are preferably located on the front surface of the device 300 but may be located on an exterior surface of the device 300. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, which may be programmed accordingly.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Exemplary embodiments have been described hereinabove regarding both handheld electronic devices, as well as the communication networks within which they cooperate. It should be appreciated, however, that a focus of the present disclosure is the enablement of displaying an image on a display screen of the handheld electronic device and toggling between panning and zooming modes that respectively pan and zoom the displayed image.

What is claimed is:

1. A method for panning and zooming a displayed image on a display screen of a handheld electronic device using an auxiliary user input device on the handheld electronic device said method comprising:
   displaying an image on the display screen of the handheld electronic device that is both pannable and zoomable using the auxiliary user input device;
   toggling between panning and zooming modes that respectively pan and zoom the displayed image by successively actuating the auxiliary user input device on the device;
   said auxiliary user input device being a trackball at least rotatable up-and-down and right-and-left relative to the handheld electronic device and said trackball is press-actuable for toggling between the panning and zooming modes;
   requesting display of menu options of user-selectable actions associated with the displayed image responsive to actuation of the auxiliary user input device;
   displaying an abbreviated menu having a short list of menu options which is a subset of a full menu of options of user-selectable actions available relative to the displayed image and the user-selectable actions of said short list of menu options having been assessed a higher probability for being user-selected than at least a portion of the user-selectable actions of the full menu of options that are not included in said short list of menu options, and said short list of menu options includes an option for at least one of panning and zooming the displayed image; and
   said short list of menu options comprising a default-designated option for one of panning and zooming the displayed image in dependence upon past activity performed relative to the displayed image whereby panning is the default-designated option when the mode immediately before was a zoom mode and zooming is the default-designated option when the mode immediately before was a pan mode.

2. The method of claim 1, wherein up-and-down rotation of the trackball results in in-and-out zooming of the displayed image.

3. The method of claim 1, wherein up-and-down and right-and-left rotation of the trackball results in corresponding image panning relative to the displayed image.

4. The method of claim 1, wherein said handheld electronic device is a wireless handheld communication device that transmits data to, and receives data from a communication network utilizing radio frequency signals.

5. The method of claim 1, wherein said handheld electronic device is sized to be cradled in the palm of a user's hand.

6. A handheld electronic device programmed to pan and zoom a displayed image on a display screen of a handheld electronic device using an auxiliary user input device said handheld electronic device comprising:
   the display screen on which an image that is both pannable and zoomable is displayed;
   the auxiliary user input device capable of both panning and zooming the image;
   a keyboard located below said display screen and configured to accommodate textual input to the handheld electronic device;
   a microprocessor having a control program associated therewith for controlling operation of said handheld electronic device, said control program configured to toggle between panning and zooming modes that respectively pan and zoom the displayed image by successively actuating the auxiliary user input device;
   said auxiliary user input device including a trackball at least rotatable up-and-down and right-and-left relative to the handheld electronic device and said trackball is press-actuable for toggling between the panning and zooming modes;
   said control program further configured to request display of menu options of user-selectable actions associated with the displayed image responsive to actuation of the auxiliary user input device, and, based on said actuation of the auxiliary user input device, the microprocessor displays an abbreviated menu having a short list of menu options which is a subset of a full menu of options of user-selectable actions available relative to the displayed image and the user-selectable actions of said short list of menu options having been assessed a higher probability for being user-selected than at least a portion of the user-selectable actions of the full menu of options that are not included in said short list of menu options, and said short list of menu options includes an option for at least one of panning and zooming the displayed image; and
   said short list of menu options comprising a default-designated option for one of panning and zooming the displayed image in dependence upon past activity performed relative to the displayed image whereby panning is the default-designated option when the mode immediately before was a zoom mode and zooming is the default-designated option when the mode immediately before was a pan mode.

7. The handheld electronic device of claim 6, wherein up-and-down rotation of the trackball results in in-and-out zooming of the displayed image.

8. The handheld electronic device of claim 6, wherein up-and-down and right-and-left rotation of the trackball results in corresponding image panning relative to the displayed image.

9. The handheld electronic device of claim 6, wherein said handheld electronic device is a wireless handheld communication device that transmits data to, and receives data from a communication network utilizing radio frequency signals.

10. The handheld electronic device of claim 6, wherein said handheld electronic device is sized to be cradled in the palm of a user's hand.

11. A computer program product for a handheld electronic device comprising a user interface including a display and a keyboard having a plurality of input keys with which letters are associated, the computer program product comprising:

a storage medium; and an operating system module residing on the storage medium and operative to run an application on the handheld electronic device, and thereby cause an image to be displayed on the display and said operating system module further operative to toggle between panning and zooming modes that respectively pan and zoom the displayed image by successively actuating an auxiliary user input device, and said operating system module is further configured to display menu options of user-selectable actions associated with the displayed image by actuating the auxiliary user input device, and, based on said actuation of the auxiliary user input device, said operating system module displays an abbreviated menu having a short list of menu options which is a subset of a full menu of options of user-selectable actions available relative to the application and the user-selectable actions of said short list of menu options having been assessed a higher probability for being user-selected than at least a portion of the user-selectable actions of the full menu of options that are not included in said short list of menu options;

said auxiliary user input device is a trackball that is at least rotatable up-and-down and right-and-left relative to the handheld electronic device and said trackball is press-actuable for toggling between the panning and zooming modes;

requesting display of menu options of user-selectable actions associated with the displayed image responsive to actuation of the auxiliary user input device; and displaying an abbreviated menu having a short list of menu options which is a subset of a full menu of options of user-selectable actions available relative to the displayed image and the user-selectable actions of said short list of menu options having been assessed a higher probability for being user-selected than at least a portion of the user-selectable actions of the full menu of options that are not included in said short list of menu options, and said short list of menu options includes an option for at least one of panning and zooming the image;

said short list of menu options comprising a default-designated option for one of panning and zooming the displayed image in dependence upon past activity performed relative to the displayed image whereby panning is the default-designated option when the mode immediately before was a zoom mode and zooming is the default-designated option when the mode immediately before was a pan mode.

* * * * *

UNITED STATES PATENT AND TRADEMARK OFFICE
CERTIFICATE OF CORRECTION

| | |
|---|---|
| PATENT NO. | : 7,802,201 B2 |
| APPLICATION NO. | : 11/618382 |
| DATED | : September 21, 2010 |
| INVENTOR(S) | : Matthew Richard Lee et al. |

It is certified that error appears in the above-identified patent and that said Letters Patent is hereby corrected as shown below:

Title Page item 75

The inventor Teneem Talukdar's name has been incorrectly spelled on the referenced publication. Please note corrections:

Incorrect Spelling: Tancem Talukdar

Correct Spelling: Taneem Talukdar

Signed and Sealed this
Twelfth Day of July, 2011

David J. Kappos
*Director of the United States Patent and Trademark Office*